(12) United States Patent
Yun et al.

(10) Patent No.: US 9,196,928 B2
(45) Date of Patent: Nov. 24, 2015

(54) ELECTROLYTE SOLUTION FOR RECHARGEABLE LITHIUM BATTERY, AND RECHARGEABLE LITHIUM BATTERY INCLUDING THE SAME

(75) Inventors: Hee-Sun Yun, Yongin-si (KR);
Yong-Beom Lee, Yongin-si (KR);
Kwang-Jo Cheong, Yongin-si (KR);
Soo-Mi Eo, Yongin-si (KR)

(73) Assignee: SAMSUNG SDI CO., LTD., Yongin-si, Gyeonggi-Do (KR)

( * ) Notice: Subject to any disclaimer, the term of this patent is extended or adjusted under 35 U.S.C. 154(b) by 774 days.

(21) Appl. No.: 12/929,284

(22) Filed: Jan. 12, 2011

(65) Prior Publication Data
US 2011/0229770 A1    Sep. 22, 2011

(30) Foreign Application Priority Data

Mar. 16, 2010    (KR) .................. 10-2010-0023507

(51) Int. Cl.
*H01M 10/0567* (2010.01)
*H01M 6/16* (2006.01)
*H01M 10/052* (2010.01)

(52) U.S. Cl.
CPC .......... *H01M 10/0567* (2013.01); *H01M 6/168* (2013.01); *H01M 10/052* (2013.01); *H01M 2300/0025* (2013.01); *Y02E 60/122* (2013.01)

(58) Field of Classification Search
CPC ..... H01M 6/168; H01M 6/164; H01M 10/05; H01M 10/0567; H01M 10/0569; H01M 2300/0025; H01M 10/052; Y02E 60/122
USPC ......... 429/330, 331, 332, 333, 339, 340, 199, 429/200, 231.1, 231.8; 252/62.2
See application file for complete search history.

(56) References Cited

U.S. PATENT DOCUMENTS

| | | | |
|---|---|---|---|
| 7,718,322 B2 | 5/2010 | Lee et al. | |
| 8,263,267 B2 | 9/2012 | Kim | |
| 2004/0013946 A1 | 1/2004 | Abe et al. | |
| 2005/0084765 A1 | 4/2005 | Lee et al. | |
| 2005/0208371 A1 | 9/2005 | Kim et al. | |
| 2006/0228626 A1 | 10/2006 | Kawashima et al. | |
| 2007/0015048 A1* | 1/2007 | Lee et al. | 429/307 |
| 2008/0220336 A1 | 9/2008 | Mun et al. | |
| 2008/0248397 A1 | 10/2008 | Jung et al. | |
| 2009/0253045 A1 | 10/2009 | Kotato et al. | |
| 2010/0015521 A1 | 1/2010 | Kim | |
| 2010/0167131 A1 | 7/2010 | Kim et al. | |
| 2010/0255369 A1 | 10/2010 | Hwang et al. | |
| 2011/0111306 A1 | 5/2011 | Park et al. | |
| 2011/0117443 A1* | 5/2011 | Lee et al. | 429/328 |
| 2012/0129053 A1 | 5/2012 | Kim et al. | |

FOREIGN PATENT DOCUMENTS

| | | |
|---|---|---|
| CN | 101385184 A | 3/2009 |
| CN | 101604769 A | 12/2009 |
| CN | 101626098 A | 1/2010 |
| EP | 2154746 A1 | 2/2010 |
| EP | 2237359 A2 | 10/2010 |
| JP | 2007-510270 A | 4/2007 |
| JP | 2008-108586 A | 5/2008 |
| JP | 2008-235008 A | 10/2008 |
| JP | 2009-032653 A | 2/2009 |
| JP | 2009-527087 A | 7/2009 |
| JP | 2010-015968 A | 1/2010 |
| JP | 2011-519133 A | 6/2011 |
| KR | 10 2003-0019457 A | 3/2003 |
| KR | 10-2005-0078443 A | 8/2005 |
| KR | 10 2006-0114919 A | 11/2006 |
| KR | 10 2007-0089958 A | 9/2007 |
| KR | 10-0814827 B1 | 3/2008 |
| KR | 10 2008-0082276 A | 9/2008 |
| KR | 10-2009-003196 * | 4/2009 |
| KR | 10 2009-0039196 A | 4/2009 |
| KR | 10-2009-0113215 A | 10/2009 |
| KR | 10 2010-0005416 A | 1/2010 |
| WO | WO 2007/094625 A1 | 8/2007 |
| WO | WO 2007/142121 A1 | 12/2007 |
| WO | WO 2009/038358 * | 3/2009 |
| WO | WO 2009/131419 A2 | 10/2009 |

OTHER PUBLICATIONS

Chinese First Office Action in CN 201110043229.X, dated Apr. 3, 2013 (with English translation) (Yun, et al.).
EP Search Report in EP 11156912.5-2119, dated May 13, 2011 (Yun, et al.).
Japanese Office Action in JP 2010-274038, dated Oct. 30, 2012 (Yun, et al.)
Korean Notice of Allowance in KR-10-2010-0023507, dated Nov. 23, 2012 (Yun, et al.).
Korean Office Action in KR 10-2010-0023507, dated Apr. 6, 2012 (Yun, et al.).
Office Action issued in corresponding Korean application, 10-2010-0023507, dated Oct. 6, 2011.
European Office Action in EP 11156912.5-1360, dated Jun. 27, 2013 (Yun, et al.).
Chinese Office Action in CN 201110043229.X, dated Dec. 2, 2013, with English Translation (Yun, et al.).

* cited by examiner

*Primary Examiner* — Laura Weiner
(74) *Attorney, Agent, or Firm* — Lee & Morse, P.C.

(57) ABSTRACT

An electrolyte solution for a rechargeable lithium battery, including a lithium salt, a non-aqueous organic solvent, and an additive including fluoroethylene carbonate, a vinyl-containing carbonate, a substituted or unsubstituted C2 to C10 cyclic sulfate, and a nitrile-based compound represented by the following Chemical Formula 1:

[Chemical Formula 1]

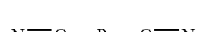

wherein, in Chemical Formula 1, R may be a substituted or unsubstituted C1 to C20 alkylene group.

8 Claims, 10 Drawing Sheets

FIG. 6: Table 1

|  |  | Ex. 1 | Comp. Ex. 1 | Comp. Ex. 2 | Comp. Ex. 3 | Comp. Ex. 4 |
|---|---|---|---|---|---|---|
| Additive (wt%) | Fluoroethylene carbonate | 3 | 3 | 3 | 3 | 3 |
|  | Vinylene carbonate | 1 | - | - | 1 | - |
|  | 1,3-propane sultone | 1 | - | - | - | 1 |
|  | Succinonitrile | 1 | - | 1 | 1 | 1 |
| Allowed to stand after charge | Thickness increase rate (%) 15 days | 2.2 | 1.6 | 3.6 | 1.9 | 2.1 |
|  | 30 days | 6.7 | 23.8 | 11.8 | 15.6 | 7.5 |
|  | Capacity retention (%) | 92 | 90 | 90 | 92 | 92 |
| Allowed to stand after discharge | OCV (V) 15 days | 2.69 | 2.52 | 1.56 | 2.54 | 2.10 |
|  | 30 days | 2.28 | 2.03 | 0.00 | 2.08 | 0.74 |
|  | Capacity retention (%) | 97 | 98 | 77 | 98 | 83 |

FIG. 7: Table 2

| | | | Example 2 | Example 3 | Example 4 | Comparative Example 5 |
|---|---|---|---|---|---|---|
| Additive (wt%) | Fluoroethylene carbonate | | 1 | 5 | 7 | - |
| | Vinylene carbonate | | 1 | 1 | 1 | 1 |
| | 1,3-propane sultone | | 1 | 1 | 1 | 1 |
| | Succinonitrile | | 1 | 1 | 1 | 1 |
| Allowed to stand after charge | Thickness increase rate (%) | 15 days | 2.1 | 4.0 | 2.4 | 2.4 |
| | | 30 days | 5.2 | 26.7 | 20.4 | 4.5 |
| | Capacity retention (%) | | 92 | 92 | 91 | 90 |
| Allowed to stand after discharge | OCV (V) | 15 days | 2.65 | 2.65 | 2.64 | 2.67 |
| | | 30 days | 2.26 | 2.20 | 2.19 | 2.23 |
| | Capacity retention (%) | | 97 | 97 | 97 | 97 |

FIG. 8: Table 3

| | | | Example 5 | Example 6 | Example 7 | Example 8 | Example 9 | Example 10 |
|---|---|---|---|---|---|---|---|---|
| Additive (wt%) | Fluoroethylene carbonate | | 3 | 3 | 3 | 3 | 3 | 3 |
| | Vinylene carbonate | | 1 | 1 | 1 | 1 | 1 | 1 |
| | 1,3-propane sultone | | 1 | 1 | 1 | 1 | 1 | 1 |
| | succinonitrile | | 0.1 | 0.5 | 3 | 5 | 7 | 10 |
| Allowed to stand after charge | Thickness increase rate (%) | 15 days | 1.3 | 2.2 | 2.0 | 2.4 | 2.8 | 2.6 |
| | | 30 days | 12.8 | 8.8 | 4.1 | 4.3 | 4.9 | 4.7 |
| | Capacity retention (%) | | 92 | 92 | 92 | 92 | 91 | 91 |
| Allowed to stand after discharge | OCV (V) | 15 days | 2.79 | 2.72 | 2.55 | 2.37 | 2.29 | 2.27 |
| | | 30 days | 2.53 | 2.36 | 2.07 | 1.86 | 1.73 | 1.63 |
| | Capacity retention (%) | | 97 | 97 | 97 | 96 | 96 | 95 |

FIG 9: Table 4

|  |  | Example 11 | Example 12 |
|---|---|---|---|
| Additive (wt%) | Fluoroethylene carbonate | 3 | 3 |
|  | Vinylene carbonate | 0.1 | 0.5 |
|  | 1,3-propane sultone | 1 | 1 |
|  | Succinonitrile | 1 | 1 |
| Allowed to stand after charge | Thickness increase rate (%) 15 days | 2.4 | 2.2 |
|  | 30 days | 7.8 | 6.6 |
|  | Capacity retention (%) | 92 | 92 |
| Allowed to stand after discharge | OCV (V) 15 days | 2.21 | 2.50 |
|  | 30 days | 1.54 | 2.01 |
|  | Capacity retention (%) | 96 | 97 |

FIG. 10: Table 5

|  |  | Example 13 | Example 14 | Example 15 |
|---|---|---|---|---|
| Additive (wt%) | Fluoroethylene carbonate | 3 | 3 | 3 |
|  | Vinylene carbonate | 1 | 1 | 1 |
|  | 1,3-propane sultone | 0.1 | 0.5 | 3 |
|  | Succinonitrile | 1 | 1 | 1 |
| Allowed to stand after charge | Thickness increase rate (%) 15 days | 2.2 | 2.1 | 2.0 |
|  | 30 days | 16.1 | 12.1 | 3.2 |
|  | Capacity retention (%) | 92 | 92 | 86 |
| Allowed to stand after discharge | OCV (V) 15 days | 2.40 | 2.63 | 2.71 |
|  | 30 days | 2.11 | 2.23 | 2.38 |
|  | Capacity retention (%) | 98 | 97 | 92 |

ELECTROLYTE SOLUTION FOR RECHARGEABLE LITHIUM BATTERY, AND RECHARGEABLE LITHIUM BATTERY INCLUDING THE SAME

BACKGROUND

1. Field

Embodiments relate to an electrolyte solution for a rechargeable lithium battery and a rechargeable lithium battery including the same.

2. Description of the Related Art

Rechargeable lithium batteries have recently drawn attention as a power source of small portable electronic devices. Rechargeable lithium batteries may use an organic electrolyte solution and may have twice the discharge voltage of a conventional battery using an alkali aqueous solution, and accordingly have high energy density.

The rechargeable lithium battery may be formed by injecting an electrolyte into a battery cell including a positive electrode including a positive active material that can intercalate and deintercalate lithium, and including a negative electrode including a negative active material that can intercalate and deintercalate lithium.

SUMMARY

It is a feature of an embodiment to provide an electrolyte solution for a rechargeable lithium battery having excellent storage characteristics at a high temperature without deteriorating battery characteristics such as capacity and room temperature cycle-life in both a state of charge and a state of discharge.

It is another feature of an embodiment to provide a rechargeable lithium battery including the electrolyte solution.

At least one of the above and other features and advantages may be realized by providing an electrolyte solution for a rechargeable lithium battery, including a lithium salt, a non-aqueous organic solvent, and an additive including fluoroethylene carbonate, a vinyl-containing carbonate, a substituted or unsubstituted C2 to C10 cyclic sulfate, and a nitrile-based compound represented by the following Chemical Formula 1:

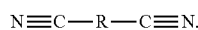

[Chemical Formula 1]

wherein, in Chemical Formula 1, R may be a substituted or unsubstituted C1 to C20 alkylene group.

The vinyl-containing carbonate may include vinylene carbonate, vinylethylene carbonate, or a combination thereof.

The cyclic sulfate may include 1,3-propane sultone, 1,3-propene sultone, 1,3-propanediol cyclic sulfate, or a combination thereof.

The nitrile-based compound may include succinonitrile, glutaronitrile, adiponitrile, pimelonitrile, suberonitrile, or a combination thereof.

The fluoroethylene carbonate may be included in an amount of about 1 to about 7 wt % based on the total weight of the electrolyte solution.

The vinyl-containing carbonate may be included in an amount of about 0.1 to about 3 wt % based on the total weight of the electrolyte solution.

The cyclic sulfate may be included in an amount of about 0.1 to about 10 wt % based on the total weight of the electrolyte solution.

The nitrile-based compound may be included in an amount of about 0.1 to about 10 wt % based on the total weight of the electrolyte solution.

At least one of the above and other features and advantages may also be realized by providing a rechargeable lithium battery, including a positive electrode, a negative electrode, and an electrolyte solution, the electrolyte solution including a lithium salt, a non-aqueous organic solvent, and an additive, the additive including fluoroethylene carbonate, a vinyl-containing carbonate, a substituted or unsubstituted C2 to C10 cyclic sulfate, and a nitrile-based compound represented by the following Chemical Formula 1:

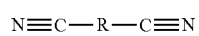

[Chemical Formula 1]

wherein; in Chemical Formula 1, R may be a substituted or unsubstituted C1 to C20 alkylene group.

The vinyl-containing carbonate may include vinylene carbonate, vinylethylene carbonate, or a combination thereof.

The cyclic sulfate may include 1,3-propane sultone, 1,3-propene sultone, 1,3-propanediol cyclic sulfate, or a combination thereof.

The nitrile-based compound may include succinonitrile, glutaronitrile, adiponitrile, pimelonitrile, suberonitrile, or a combination thereof.

The fluoroethylene carbonate may be included in an amount of about 1 to about 7 wt % based on the total weight of the electrolyte solution.

The vinyl-containing carbonate may be included in an amount of about 0.1 to about 3 wt % based on the total weight of the electrolyte solution.

The cyclic sulfate may be included in an amount of about 0.1 to about 10 wt % based on the total weight of the electrolyte solution.

The nitrile-based compound may be included in an amount of about 0.1 to about 10 wt % based on the total weight of the electrolyte solution.

BRIEF DESCRIPTION OF THE DRAWINGS

The above and other features and advantages will become more apparent to those of skill in the art by describing in detail example embodiments with reference to the attached drawings, in which:

FIGS. 6-10 illustrate Tables 1-5, respectively.

DETAILED DESCRIPTION

Figure 1:
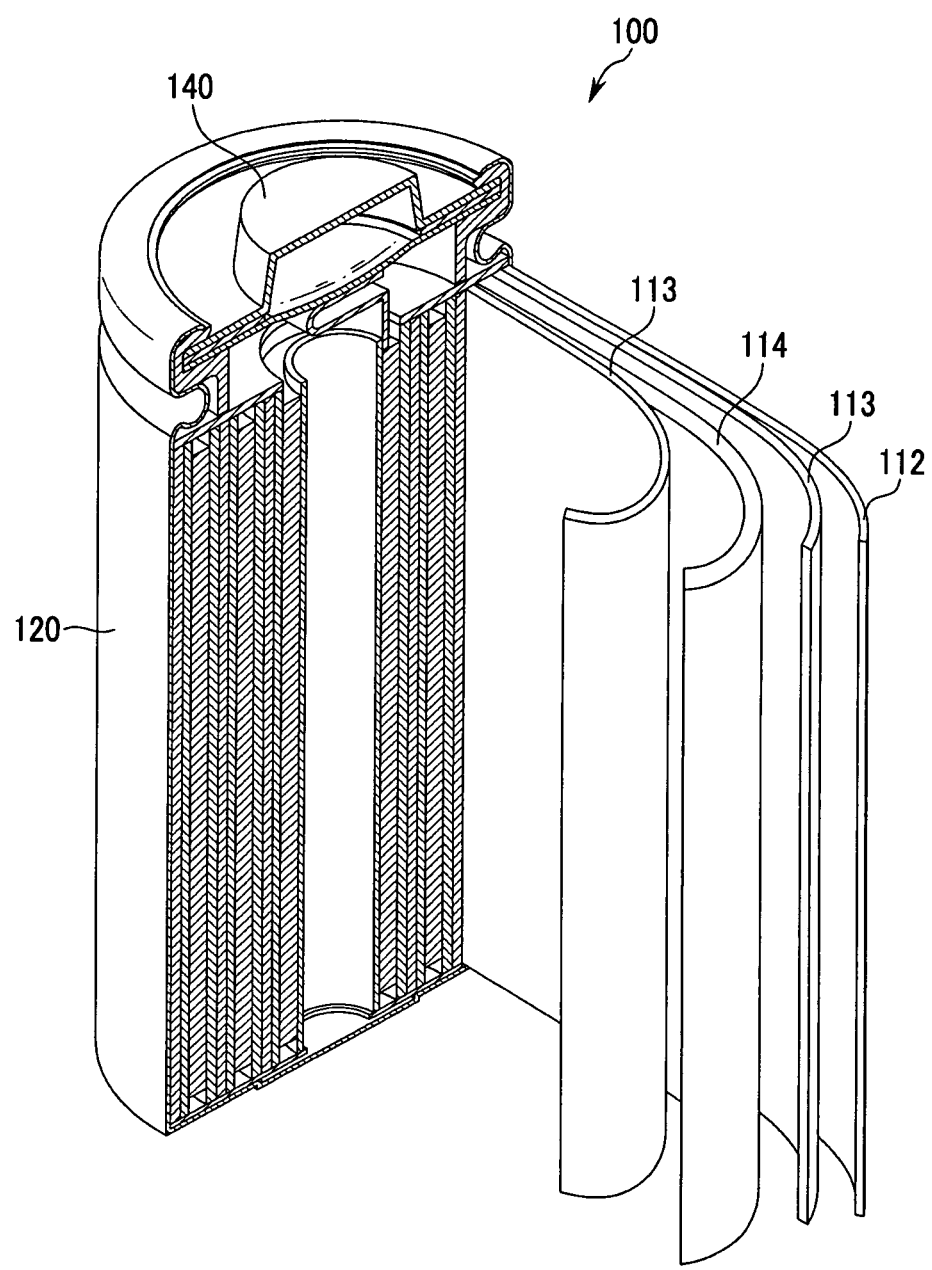
FIG. 1 illustrates a schematic view of a rechargeable lithium battery according to an embodiment.

Korean Patent Application No. 10-2010-0023507 filed on Mar. 16, 2010, in the Korean Intellectual Property Office, and entitled "Electrolyte Solution for Rechargeable Lithium Battery, and Rechargeable Lithium Battery including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

When a specific definition is not otherwise provided, the term "substituted" refers to an alkylene group substituted with a halogen, a C1 to C20 alkyl group, a C6 to C30 aryl group, or a C1 to C20 alkoxy group, instead of at least one hydrogen.

When a specific definition is not otherwise provided, the term "room temperature" refers to a temperature ranging from about 23° C. to about 27° C., and "high temperature" refers to a temperature ranging from about 40° C. to about 100° C.

An electrolyte solution for a rechargeable lithium battery according to an embodiment may include a lithium salt, a non-aqueous organic solvent, and an additive. The additive may include fluoroethylene carbonate, a vinyl-containing carbonate, a substituted or unsubstituted C2 to C10 cyclic sulfate, and a nitrile-based compound.

The fluoroethylene carbonate may be included in an amount of about 1 wt % to about 7 wt % based on the total weight of the electrolyte solution, and according to an embodiment, the fluoroethylene carbonate may be included in an amount of about 1 wt % to about 5 wt % based on the total weight of the electrolyte solution. When the fluoroethylene carbonate is included within the range, excellent storage characteristics at a high temperature may be provided without deteriorating capacity and room temperature cycle-life characteristics in both a state of charge and a state of discharge.

The vinyl-containing carbonate may include vinylene carbonate, vinylethylene carbonate, or a combination thereof.

The vinyl-containing carbonate may be included in an amount of about 0.1 wt % to about 3 wt % based on the total amount of the electrolyte solution. According to an embodiment, the vinyl-containing carbonate may be included in an amount of about 0.5 wt % to about 3 wt %. When the vinyl-containing carbonate is included within the range, the generation of a gas may be suppressed in the state of charge at a high temperature without deteriorating capacity and room temperature cycle-life characteristics, and since an open circuit voltage (OCV) value may be prevented from being decreased in the state of discharge at a high temperature, the storage characteristics at a high temperature may be excellent in both a state of charge and a state of discharge.

The cyclic sulfate may be included in an amount of about 0.1 wt % to about 10 wt % based on the total amount of the electrolyte solution. According to an embodiment, the cyclic sulfate may be included in an amount of about 0.1 wt % to about 3 wt %. When the cyclic sulfate is included within the range, the generation of a gas may be suppressed in the state of charge at a high temperature without deteriorating capacity and room temperature cycle-life characteristics. Since the OCV value may be prevented from being decreased in the state of discharge at a high temperature, excellent storage characteristics at a high temperature may be provided.

The nitrile-based compound may be represented by the following Chemical Formula 1.

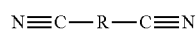 [Chemical Formula 1]

$$N\equiv C-R-C\equiv N$$

In Chemical Formula 1, R may be a substituted or unsubstituted C1 to C20 alkylene group.

Examples of the nitrile-based compound include succinonitrile, glutaronitrile, adiponitrile, pimelonitrile, suberonitrile, or a combination thereof, and in an embodiment, succinonitrile is preferable.

The nitrile-based compound may be included in an amount of about 0.1 wt % to about 10 wt % based on the total amount of the electrolyte solution. According to an embodiment, the nitrile-based compound may be included in an amount of about 0.1 wt % to about 3 wt %. When the nitrile-based compound is included within the range, the generation of a gas may be suppressed in the state of charge at a high temperature without deteriorating capacity and room temperature cycle-life characteristics, and since the OCV value may be prevented from being decreased in the state of discharge at a high temperature, the storage characteristics at a high temperature may be excellent in both a state of charge and a state of discharge.

The lithium salt may supply lithium ions in the battery, perform a basic operation of a rechargeable lithium battery, and improve lithium ion transport between positive and negative electrodes.

Examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalate borate, LiBOB), or a combination thereof.

The lithium salt may be used at a concentration ranging from about 0.1 to about 2.0 M. When the lithium salt is included at the concentration range, electrolyte performance and lithium ion mobility may be enhanced due to optimal electrolyte conductivity and viscosity.

The non-aqueous organic solvent may serve as a medium for transmitting ions taking part in the electrochemical reaction of the battery. The non-aqueous organic solvent may include a carbonate-based, ester-based, ether-based, ketone-based, alcohol-based, or aprotic solvent.

Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When a linear carbonate compound and a cyclic carbonate compound are mixed with each other, the dielectric constant may increase and the viscosity may decrease. The cyclic carbonate compound and linear carbonate compound may be mixed together in a volume ratio of about 1:1 to about 1:9.

Examples of the ester-based solvent include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutylether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like.

The non-aqueous organic solvent may be used singularly or in a mixture. When the organic solvent is used in a mixture, the mixture ratio may be controlled in accordance with a desirable battery performance.

A rechargeable lithium battery according to another embodiment is described referring to FIG. 1. The rechargeable lithium battery of FIG. 1 is one example, but is not limited thereto.

FIG. 1 illustrates a schematic view of a rechargeable lithium battery 100 according to an embodiment.

The rechargeable lithium battery 100 may include a negative electrode 112, a positive electrode 114, a separator 113 interposed between the negative electrode 112 and the positive electrode 114, an electrolyte impregnating the separator 113, a battery case 120, and a sealing member 140 sealing the battery case 120.

The positive electrode 114 may include a current collector and a positive active material layer disposed on the current collector. The positive active material layer may include a positive active material and a binder. The positive active material layer may further include a conductive material.

The current collector may be aluminum (Al), but is not limited thereto.

The positive active material may include lithiated intercalation compounds that reversibly intercalate and deintercalate lithium ions. The positive active material may include a composite oxide including at least one of cobalt, manganese, and nickel, as well as lithium. In particular, the following lithium-containing compounds may be used.

$Li_aA_{1-b}B_bD_2$ (wherein, in the chemical formula, $0.90 \le a \le 1.8$ and $0 \le b \le 0.5$); $Li_aE_{1-b}B_bO_{2-c}D_c$ (wherein, in the chemical formula, $0.90 \le a \le 1.8$, $0 \le b \le 0.5$, and $0 \le c \le 0.05$); $LiE_{2-b}B_bO_{4-c}D_c$ (wherein, in the chemical formula, $0 \le b \le 0.5$ and $0 \le c \le 0.05$); $Li_aNi_{1-b-c}Co_bB_cD_\alpha$ (wherein, in the chemical formula, $0.90 \le a \le 1.8$, $0 \le b \le 0.5$, $0 \le c \le 0.05$, and $0 < \alpha \le 2$); $Li_aNi_{1-b-c}Co_bB_cO_{2-\alpha}R_\alpha$ (wherein, in the chemical formula, $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}R_2$ (wherein, in the chemical formula, $0.90 \le a \le 1.8$, $0 \le b \le 0.5$, $0 \le c \le 0.05$, and $0 < \alpha < 2$); $Li_aNi_{1-b-c}Mn_bB_cD_\alpha$ (wherein, in the chemical formula, $0.90 \le a \le 1.8$, $0 \le b \le 0.5$, $0 \le c \le 0.05$, and $0 < \alpha \le 2$); $Li_aNi_{1-b-c}Mn_bB_cO_{2-\alpha}R_\alpha$ (wherein, in the chemical formula, $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}R_2$ (wherein, in the chemical formula, $0.90 \le a \le 1.8$, $0 \le b \le 0.5$, $0 \le c \le 0.05$, and $0 < \alpha < 2$); $Li_aNi_bE_cG_dO_2$ (wherein, in the chemical formula, $0.90 \le a \le 1.8$, $0 \le b \le 0.9$, $0 \le c \le 0.5$, and $0.001 \le d \le 0.1$.); $Li_aNi_bCo_cMn_dGeO_2$ (wherein, in the chemical formula, $0.90 \le a \le 1.8$, $0 \le b \le 0.9$, $0 \le c \le 0.5$, $0 \le d \le 0.5$, and $0.001 \le e \le 0.1$.); $Li_aNiG_bO_2$ (wherein, in the chemical formula, $0.90 \le a \le 1.8$ and $0.001 \le b \le 0.1$.); $Li_aCoG_bO_2$ (wherein, in the chemical formula, $0.90 \le a \le 1.8$ and $0.001 \le b \le 0.1$.); $Li_aMnG_bO_2$ (wherein, in the chemical formula, $0.90 \le a \le 1.8$ and $0.001 \le b \le 0.1$.); $Li_aMn_2G_bO_4$ (wherein, in the chemical formula, $0.90 \le a \le 1.8$ and $0.001 \le b \le 0.1$.); $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the formulae, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; R is F, S, P, or a combination thereof; G may be Al, Cr, Mn, Fe, Mg, La, Ce, Sr, V, or a combination thereof; Q may be Ti, Mo, Mn, or a combination thereof; Z may be Cr, V, Fe, Sc, Y, or a combination thereof; and J may be V, Cr, Mn, Co, Ni, Cu, or a combination thereof.

The compound may have a coating layer on the surface, or may be mixed with a compound having a coating layer. The coating layer may include at least one coating element compound, which may be an oxide of a coating element, a hydroxide of a coating element, an oxyhydroxide of a coating element, an oxycarbonate of a coating element, or a hydroxyl carbonate of a coating element. The compounds for a coating layer can be amorphous or crystalline. The coating element for a coating layer may include Mg, Al, Co, K, Na, Ca, Si, Ti, V, Sn, Ge, Ga, B, As, Zr, or a mixture thereof. The coating layer may be formed in a method having no negative influence on properties of a positive active material by including these elements in the compound. For example, the method may include a coating method such as spray coating, dipping, and the like, but is not illustrated in more detail, since it is well-known to those who work in the related field.

The binder may be provided to improve binding properties of the positive active material particles to each other and to a current collector. Examples of the binder include polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc., and combinations thereof, but are not limited thereto.

An electrically conductive material that does not cause a chemical change may be used as a conductive material. Examples of the conductive material include natural graphite, artificial graphite, carbon black, acetylene black, ketjen black, a carbon fiber, a metal powder or a metal fiber including copper, nickel, aluminum, silver, and so on, and a polyphenylene derivative.

The negative electrode 112 may include a current collector and a negative active material layer disposed on the current collector, and the negative active material layer may include a negative active material.

The current collector may include a copper foil, a nickel foil, a stainless steel foil, a titanium foil, a nickel foam, a copper foam, a polymer substrate coated with a conductive metal, or combinations thereof.

The negative active material layer may include a binder. The negative active material layer may further include a conductive material.

The negative active material may include a material that reversibly intercalates/deintercalates lithium ions, a lithium metal, a lithium metal alloy, a material being capable of doping lithium, and/or a transition metal oxide.

The material that reversibly intercalates/deintercalates lithium ions may include carbon materials. The carbon material may be any generally-used carbon-based negative active material in a lithium ion rechargeable battery. Examples of the carbon material include crystalline carbon, amorphous carbon, and a mixture thereof. The crystalline carbon may be non-shaped, or sheet, flake, spherical, or fiber shaped natural graphite or artificial graphite. The amorphous carbon may be a soft carbon (carbon obtained by sintering at a low temperature), a hard carbon (carbon obtained by sintering at a high temperature), mesophase pitch carbide, fired coke, and the like.

Examples of the lithium metal alloy include lithium and a metal, which may be Na, K, Rb, Cs, Fr, Be, Mg, Ca, Sr, Si, Sb, Pb, In, Zn, Ba, Ra, Ge, Al, or Sn.

Examples of the material being capable of doping lithium include Si, $SiO_x$ ($0 < x < 2$), a Si—Y alloy (where Y is an element, the element being an alkali metal, an alkaline-earth metal, a group 13 element, a group 14 element, a transition element, a rare earth element, or a combination thereof, and is not Si), Sn, $SnO_2$, Sn—Y (where Y is an element, the element being an alkali metal, an alkaline-earth metal, a group 13 element, a group 14 element, a transition element, a rare earth element, or combinations thereof, and is not Sn), or mixtures thereof. At least one of these materials may be mixed with $SiO_2$. The element Y may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

Examples of the transition metal oxide include vanadium oxide, lithium vanadium oxide, and the like.

The binder may be provided to improve binding properties of the negative active material particles to each other and to a current collector. Examples of the binder include polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc., and combinations thereof, but are not limited thereto.

An electrically conductive material that does not cause a chemical change may be used as a conductive material. Examples of the conductive material include: carbon-based materials such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; and mixtures thereof.

The positive electrode 114 and the negative electrode 112 may be manufactured by a method including mixing the active material, a conductive material, and a binder to provide an active material composition, and coating the composition on a current collector. The electrode manufacturing method is well known, and thus is not described in detail in the present specification. A solvent such as N-methylpyrrolidone may be used, but it is not limited thereto.

The separator 113 may be formed as a single layer or a multilayer, and may be made of polyethylene, polypropylene, polyvinylidene fluoride, or a combination thereof.

The electrolyte solution may include the electrolyte solution described above.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect. Furthermore, what is not described in this specification can be sufficiently understood by those who have knowledge in this field and will not be illustrated here.

Preparation of Electrolyte Solution

Examples 1 to 15 and Comparative Examples 1 to 5

1.3 M of $LiPF_6$ was dissolved in a solution obtained by mixing ethylene carbonate (EC), ethylmethyl carbonate (EMC), and diethyl carbonate (DEC) in a volume ratio of 3:5:2. An electrolyte solution was prepared by adding fluoroethylene carbonate, vinylene carbonate, 1,3-propane sultone, and succinonitrile into the mixed solution as additives in the amounts presented in the Tables 1 to 5 in FIGS. 6 to 10, respectively. The amounts of the respective additive components were based on the total amount of the electrolyte solution.

Manufacturing of Rechargeable Lithium Battery Cell

A positive active material layer composition was prepared by mixing $LiCoO_2$ as a positive active material, polyvinylidene fluoride (PVDF) as a binder, and carbon black as a conductive material in the weight ratio of 96:2:2, respectively, and dispersing the mixture in N-methyl-2-pyrrolidone. A positive electrode was manufactured by coating a 20 μm-thick aluminum foil with the positive active material layer composition, drying it, and rolling it.

A negative active material layer composition was prepared by mixing a mixture of natural graphite and artificial graphite as a negative active material, styrene-butadiene rubber as a binder, and carboxylmethyl cellulose as a dispersing agent in the weight ratio of about 97.5:1.5:1, and dispersing the mixture in N-methyl-2-pyrrolidone. A negative electrode was manufactured by coating a 15 μm-thick copper foil with the positive active material layer composition, drying it, and rolling it.

A rechargeable lithium battery cell of a stacked structure was manufactured to have 1 C capacity of about 1200 mAh by using the manufactured positive electrode and negative electrode, and a separator formed of a polyethylene material, and spiral-winding and compressing them. Herein, the electrolyte solutions prepared according to Examples 1 to 15 and Comparative Examples 1 to 5 were used.

Experimental Example 1

Evaluation of Storage Characteristics at High Temperature and Capability of Rechargeable Lithium Battery Cells in the State of Charge and the State of Discharge The storage characteristics at a high temperature and capacity of rechargeable lithium battery cells manufactured according to Examples 1 to 15 and Comparative Examples 1 to 5 were measured in the state of charge and the state of discharge, and the results are presented in the Tables 1 to 5. When the rechargeable lithium battery cells were stored at a high temperature in the state of charge, gas was continuously generated due to electrochemical and thermal decomposition of the electrolyte solution and solid electrolyte interface (SEI) film component, and this led to degradation. Thus, the thickness increase rate of a rechargeable lithium battery cell may be used as a standard for evaluating high-temperature stability in the state of charge. On the other hand, when the rechargeable lithium battery cells were stored at a high temperature in the state of discharge, an open circuit voltage (OCV) value was decreased. When the OCV value was brought down to a predetermined OCV value, the generation of gas was increased significantly. Thus, the OCV value of a rechargeable lithium battery cell may be used as a standard for evaluating high-temperature stability in the state of discharge.

Therefore, storage characteristics at a high temperature in the state of charge were evaluated by the thickness increase rate of a rechargeable lithium battery cell. Herein, the charge was performed at 0.5 C in a CC/CV mode up to about 4.2 V and the charge was terminated when the current was 60 mAh, and the thickness increase rate (%) was measured using a vernier calipers in-situ after the rechargeable lithium battery cell was allowed to stand at about 60° C. for about 15 days and about 30 days, respectively.

Also, the storage characteristics at a high temperature in the state of discharge were evaluated by an OCV value of a rechargeable lithium battery cell. Herein, the discharge was performed at about 0.5 C in a CC mode, and the discharge was terminated at about 3.0 V. The OCV value (V) was measured using a HIOKI multimeter after the rechargeable lithium battery cell was allowed to stand at about 60° C. for about 15 days and about 30 days, respectively.

It may be seen from Tables 1 to 5 in FIGS. 6 to 10, respectively, that the rechargeable lithium battery cells manufactured according to Examples 1 to 15 using fluoroethylene carbonate, a vinyl-containing carbonate, cyclic sulfate, and a nitrile-based compound as additives to the electrolyte solution in appropriate amounts according to embodiments had excellent storage characteristics at a high temperature in both a state of charge and a state of discharge, compared with those manufactured according to Comparative Examples 1 to 5.

Referring to Table 1, the rechargeable lithium battery cell manufactured according to Comparative Example 1 using only fluoroethylene carbonate and the rechargeable lithium battery cell manufactured according to Comparative Example 3 that did not use cyclic sulfate had excellent high-temperature stability in the state of discharge, but the high-temperature stability was decreased in the state of charge. Also, the rechargeable lithium battery cell manufactured according to Comparative Example 2 using only fluoroethylene carbonate and a nitrile-based compound, and the rechargeable lithium battery cell manufactured according to Comparative Example 4 that did not use a vinyl-containing carbonate, had excellent high-temperature stability in the state of charge, but the high-temperature stability was decreased in the state of discharge.

Table 2 shows cases of using fluoroethylene carbonate in diverse amounts. It may be seen from Table 2 that the rechargeable lithium battery cells manufactured according to Examples 2 to 4 using fluoroethylene carbonate in an amount of about 1 to about 7 wt % based on the total amount of electrolyte solution had excellent high-temperature stability in both a state of charge and a state of discharge.

Table 3 shows cases of using a nitrile-based compound in diverse amounts. It may be seen from Table 3 that the rechargeable lithium battery cells manufactured according to Examples 5 to 10 using the nitrile-based compound in an amount of about 0.1 to about 10 wt % based on the total amount of the electrolyte solution had excellent high-temperature stability in both a state of charge and a state of discharge.

Table 4 shows cases of using vinyl-containing carbonate in diverse amounts. It may be seen from Table 4 that the rechargeable lithium battery cells manufactured according to Examples 11 and 12 using the vinyl-containing carbonate in an amount of about 0.1 to about 3 wt % based on the total amount of the electrolyte solution had excellent high-temperature stability in both a state of charge and a state of discharge.

Table 5 shows cases of using cyclic sulfate in diverse amounts. It may be seen from Table 5 that the rechargeable lithium battery cells manufactured according to Examples 13 to 15 using the cyclic sulfate in an amount of about 0.1 to about 10 wt % based on the total amount of the electrolyte solution had excellent high-temperature stability in both a state of charge and a state of discharge.

Experimental Example 2

Evaluation of Cycle-Life Characteristics of Rechargeable Lithium Battery Cells

Figure 2:
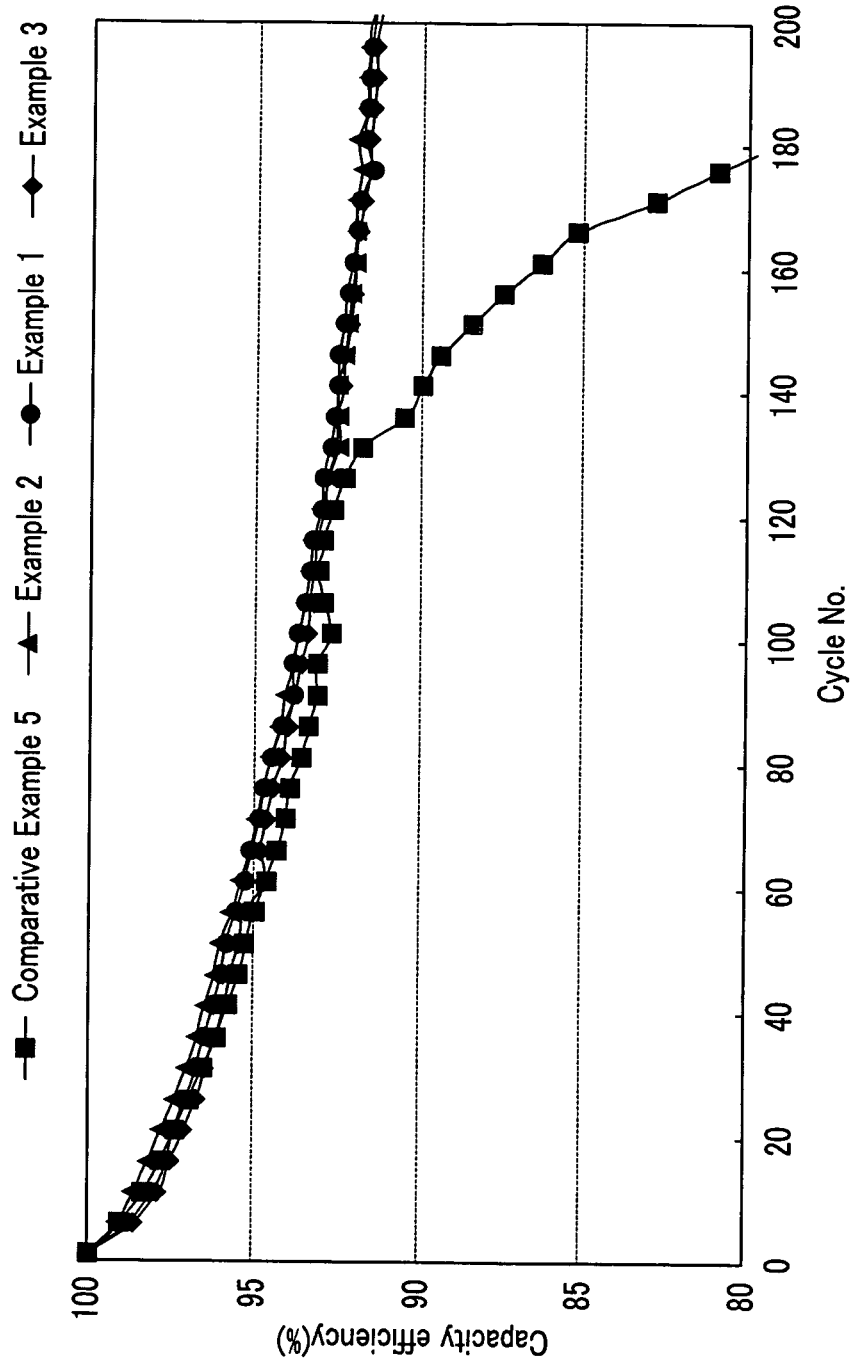
FIG. 2 illustrates a graph showing cycle-life of rechargeable lithium battery cells according to Examples 1 to 3 and Comparative Example 5.
Figure 3:
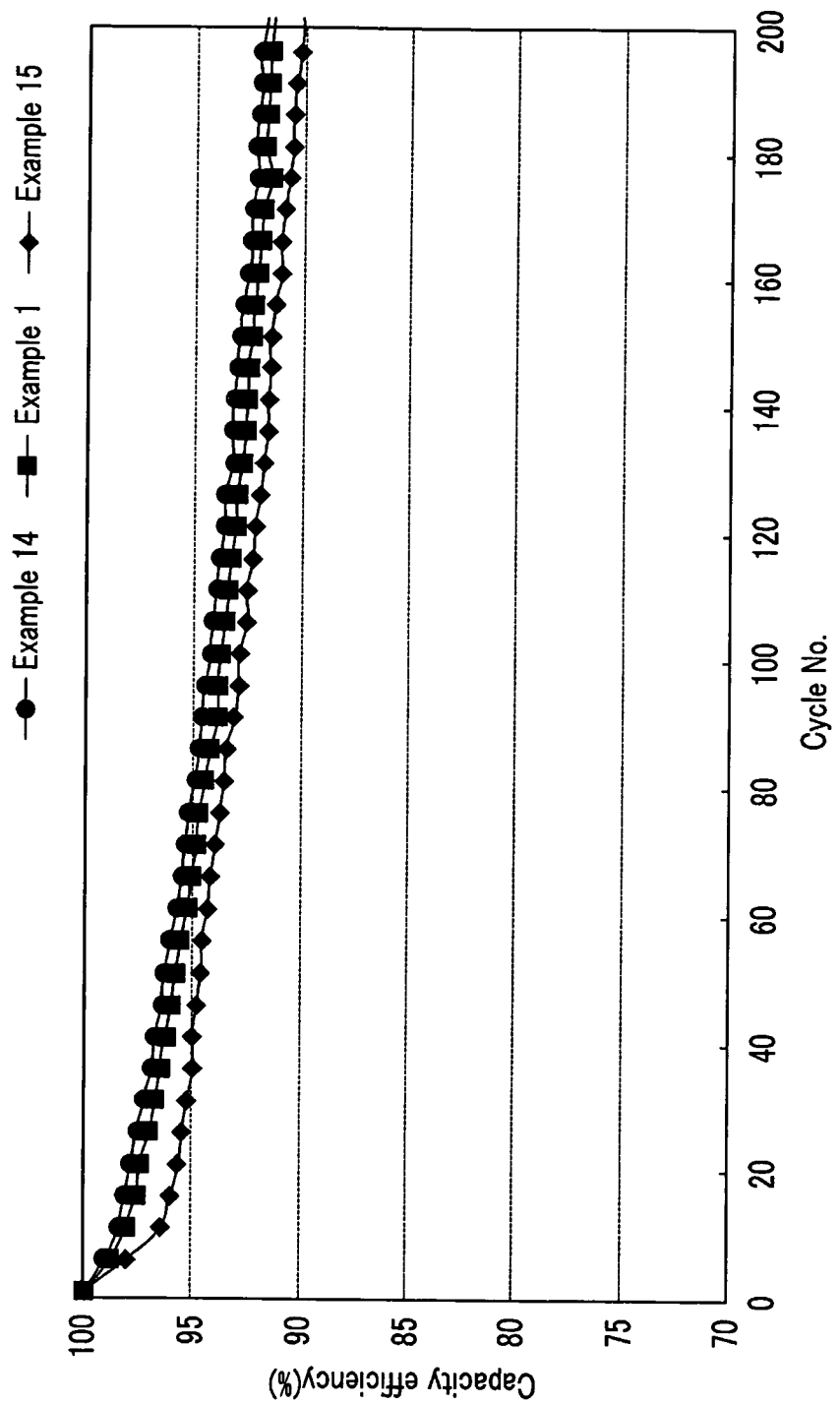
FIG. 3 illustrates a graph showing cycle-life of rechargeable lithium battery cells according to Examples 1, 14, and 15.

The cycle-life characteristics of the rechargeable lithium battery cells manufactured according to Examples 1 to 3 and Comparative Example 5 were evaluated and the results are presented in FIG. 2, and the cycle-life characteristics of the rechargeable lithium battery cells manufactured according to Examples 1, 14, and 15 were evaluated and the results are presented in FIG. 3. Also, the cycle-life characteristics of the rechargeable lithium battery cells manufactured according to Examples 1 and 5 to 7 were evaluated and the results are presented in FIG. 4, and the cycle-life characteristics of the rechargeable lithium battery cells manufactured according to Examples 1 and 12 were evaluated and the results are presented in FIG. 5.

To evaluate the cycle-life characteristics, the charge was performed at 1 C in a CC/CV mode up to about 4.2 V, and when the current was about 60 mAh, the charge was paused for about 10 minutes, and the discharge was performed at 1 C in a CC mode, and paused for about 10 minutes at about 3.2 V. This process was performed 200 times.

FIG. 2 illustrates a graph of cycle-life of rechargeable lithium battery cells according to Examples 1 to 3 and Comparative Example 5.

Referring to FIG. 2, while the cycle-life characteristics were not greatly decreased in the rechargeable lithium battery cells of Examples 1 to 3 showing cases of using fluoroethylene carbonate in diverse amounts within an appropriate range according to an embodiment, the rechargeable lithium battery cell of Comparative Example 5 that did not use fluoroethylene carbonate showed a remarkable decrease in the cycle-life characteristic. In other words, although the rechargeable lithium battery cell of Comparative Example 5 may have excellent high-temperature stability in both a state of charge and a state of discharge, the excellent high-temperature stability was accompanied by a deteriorated cycle-life characteristic.

FIG. 3 illustrates a graph of cycle-life of rechargeable lithium battery cells according to Examples 1, 14, and 15.

Referring to FIG. 3, the cycle-life characteristics of the rechargeable lithium battery cells manufactured according to Examples 1, 14 and 15, which show cases of using cyclic sulfate in diverse amounts within an appropriate range according to an embodiment, were all maintained excellently.

Figure 4:
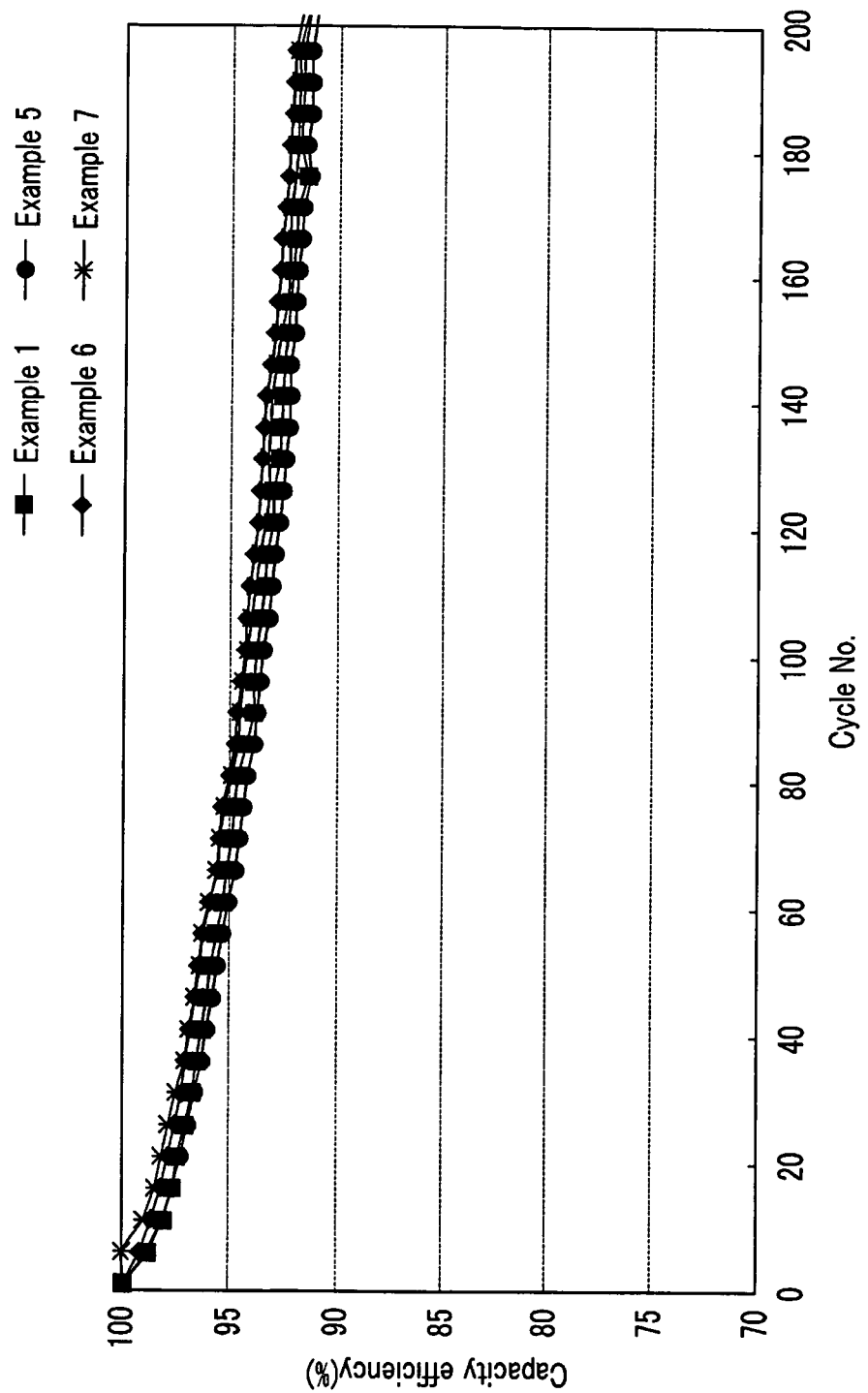
FIG. 4 illustrates a graph showing cycle-life of rechargeable lithium battery cells according to Examples 1 and 5 to 7.

FIG. 4 illustrates a graph of cycle-life of rechargeable lithium battery cells according to Examples 1 and 5 to 7.

Referring to FIG. 4, the cycle-life characteristics of the rechargeable lithium battery cells manufactured according to Examples 1 and 5 to 7, which show cases of using a nitrile-based compound in diverse amounts within an appropriate range according to an embodiment, were all maintained excellently.

Figure 5:
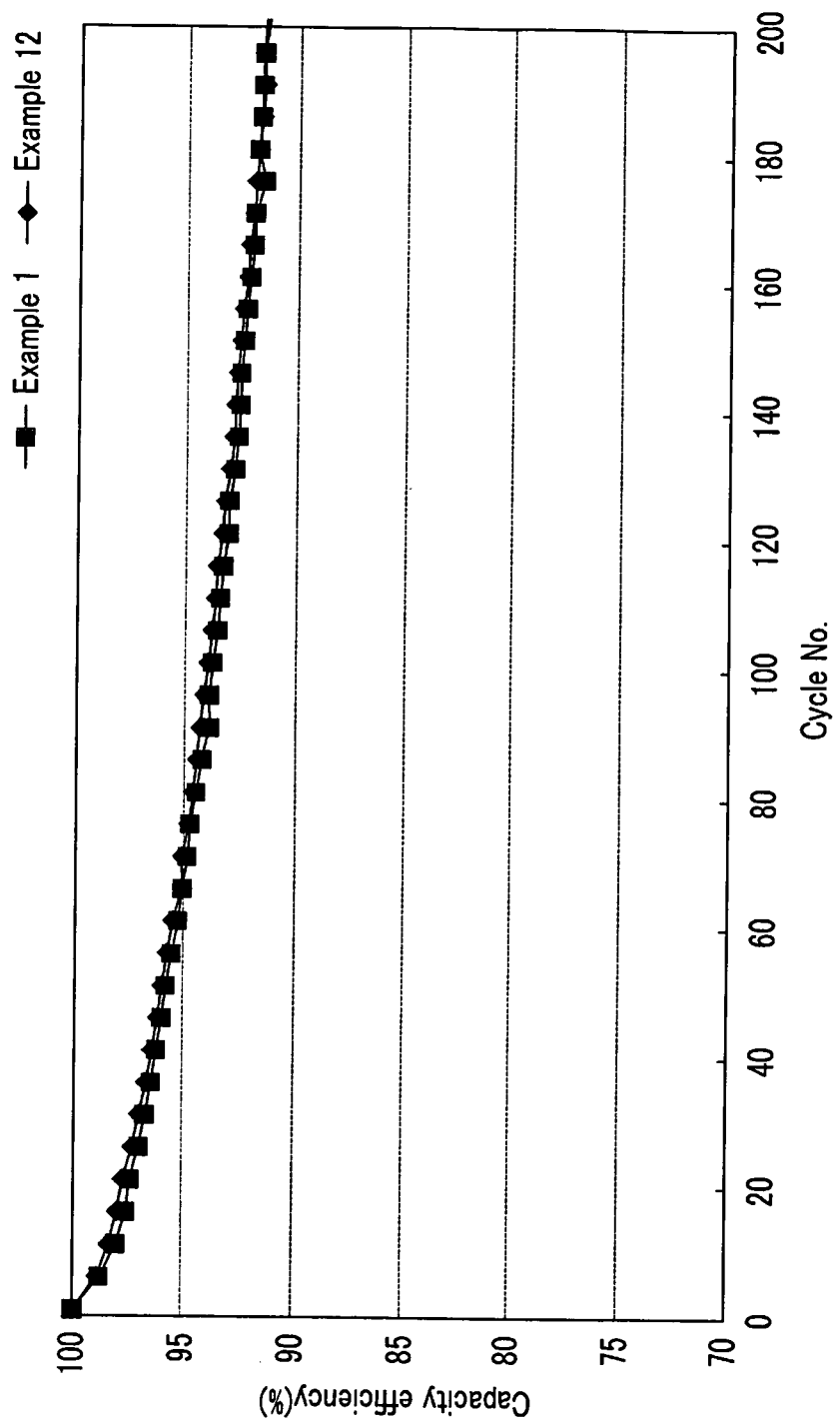
FIG. 5 illustrates a graph showing cycle-life of rechargeable lithium battery cells according to Examples 1 and 12.

FIG. 5 illustrates a graph of cycle-life of rechargeable lithium battery cells according to Examples 1 and 12.

Referring to FIG. 5, in the rechargeable lithium battery cells manufactured according to Examples 1 and 12, showing examples where a vinyl-containing carbonate was used in diverse amounts within an appropriate range according to an embodiment, the cycle-life characteristics of the rechargeable lithium battery cells were maintained excellently.

As described above, the rechargeable lithium battery cells manufactured according to Examples 1 to 15 using fluoroethylene carbonate, a vinyl-containing carbonate, cyclic sulfate, and a nitrile-based compound as additives of an electrolyte solution in appropriate amounts according to an embodiment showed excellent storage characteristics at a high temperature in both a state of charge and a state of discharge, without deteriorating battery cells characteristics such as capacity and room temperature cycle-life.

Improvement in storage characteristics of rechargeable lithium batteries at a high temperature are need, but to-date has not been adequate in improving the storage characteristics at a high temperature with respect to both state of charge (SOC=100%) and state of discharge (SOC=0%). Also, battery characteristics such as capacity and room temperature cycle-life may be deteriorated by general additives. However, when the electrolyte solution for a rechargeable lithium battery according to an embodiment is used, it may be possible to realize a rechargeable lithium battery having excellent storage characteristics at a high temperature without deteriorating battery characteristics such as capacity and room temperature cycle-life in both a state of charge and a state of discharge.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An electrolyte solution for a rechargeable lithium battery, comprising:
    a lithium salt;
    a non-aqueous organic solvent; and
    an additive, the additive including:
        fluoroethylene carbonate in an amount ranging from about 1 to about 3 wt % based on the total weight of the electrolyte solution,
        vinylene carbonate, vinylethylene carbonate, or a combination thereof in an amount of about 0.1 to about 3 wt % based on the total weight of the electrolyte solution,
        1,3-propane sultone, 1,3-propandiol cyclic sulfate, or a combination thereof in an amount of about 0.1 to about 10 wt % based on the total weight of the electrolyte solution, and
        succinonitrile, glutaronitrile, adiponitrile, pimelonitrile, suberonitrile, or a combination thereof in an amount of about 0.1 to about 10 wt % based on the total weight of the electrolyte solution.

2. The electrolyte solution for a rechargeable lithium battery as claimed in claim 1, wherein the vinylene carbonate, vinylethylene carbonate, or combination thereof is included in an amount of about 0.5 to about 3 wt % based on the total weight of the electrolyte solution.

3. The electrolyte solution for a rechargeable lithium battery as claimed in claim 2, wherein the 1,3-propane sultone, 1,3-propandiol cyclic sulfate, or combination thereof is included in an amount of about 0.1 to about 3 wt % based on the total weight of the electrolyte solution.

4. The electrolyte solution for a rechargeable lithium battery as claimed in claim 3, wherein the succinonitrile, glutaronitrile, adiponitrile, pimelonitrile, suberonitrile, or combination thereof is included in an amount of about 0.1 to about 3 wt % based on the total weight of the electrolyte solution.

5. A rechargeable lithium battery, comprising:
    a positive electrode;
    a negative electrode; and
    an electrolyte solution, the electrolyte solution including a lithium salt, a non-aqueous organic solvent, and an additive, the additive including:
        fluoroethylene carbonate in an amount ranging from about 1 to about 3 wt % based on the total weight of the electrolyte solution,
        vinylene carbonate, vinylethylene carbonate, or a combination thereof in an amount of about 0.1 to about 3 wt % based on the total weight of the electrolyte solution,
        1,3-propane sultone, 1,3-propandiol cyclic sulfate, or a combination thereof in an amount of about 0.1 to about 10 wt % based on the total weight of the electrolyte solution, and
        succinonitrile, glutaronitrile, adiponitrile, pimelonitrile, suberonitrile, or a combination thereof in an amount of about 0.1 to about 10 wt % based on the total weight of the electrolyte solution.

6. The rechargeable lithium battery as claimed in claim 5, wherein the vinylene carbonate, vinylethylene carbonate, or combination thereof is included in an amount of about 0.5 to about 3 wt % based on the total weight of the electrolyte solution.

7. The rechargeable lithium battery of as claimed in claim 6, wherein the 1,3-propane sultone, 1,3-propandiol cyclic sulfate, or combination thereof is included in an amount of about 0.1 to about 3 wt % based on the total weight of the electrolyte solution.

8. The rechargeable lithium battery as claimed in claim 7, wherein the succinonitrile, glutaronitrile, adiponitrile, pimelonitrile, suberonitrile, or combination thereof is included in an amount of about 0.1 to about 3 wt % based on the total weight of the electrolyte solution.

* * * * *